(12) United States Patent
Kistner et al.

(10) Patent No.: US 6,547,962 B2
(45) Date of Patent: Apr. 15, 2003

(54) STORMWATER TREATMENT SYSTEM

(75) Inventors: Michael J. Kistner, Lockport, NY (US); Paul J. Rowe, Fairport, NY (US)

(73) Assignee: Tec-Kon Enterprises, LLC, East Pembroke, NY (US)

( * ) Notice: Subject to any disclaimer, the term of this patent is extended or adjusted under 35 U.S.C. 154(b) by 0 days.

(21) Appl. No.: 09/892,270

(22) Filed: Jun. 27, 2001

(65) Prior Publication Data

US 2003/0000892 A1 Jan. 2, 2003

(51) Int. Cl.$^7$ .................................................. E03F 5/14
(52) U.S. Cl. ..................... 210/170; 210/254; 210/519; 210/521; 210/532.1; 210/538; 210/512.1; 404/4
(58) Field of Search ................................. 210/163, 170, 210/254, 519, 521, 532.1, 538, 512.1; 404/4, 2

(56) References Cited

U.S. PATENT DOCUMENTS

| | | | | |
|---|---|---|---|---|
| 700,056 A | * | 5/1902 | Kremer ....................... 210/538 |
| 2,308,670 A | * | 1/1943 | Bolton ...................... 210/572.1 |
| 3,204,772 A | * | 9/1965 | Ruxton | |
| 3,285,422 A | * | 11/1966 | Wiley ...................... 210/572.1 |
| 3,965,013 A | * | 6/1976 | Jackson ....................... 210/519 |
| 4,983,295 A | * | 1/1991 | Lamb et al. ................. 210/521 |
| 5,433,845 A | * | 7/1995 | Greene et al. .............. 210/170 |
| 5,575,909 A | * | 11/1996 | Foster ...................... 210/512.1 |
| 5,725,760 A | * | 3/1998 | Monteith .................. 210/532.1 |
| 5,746,911 A | * | 5/1998 | Pank .......................... 210/538 |
| 5,759,415 A | | 6/1998 | Adams | |
| 6,062,767 A | * | 5/2000 | Kizhnerman et al. .... 210/532.1 |
| 6,077,448 A | * | 6/2000 | Tran-Quoc-Nam et al. . 210/254 |
| 6,120,684 A | | 9/2000 | Kistner et al. | |
| 6,190,545 B1 | * | 2/2001 | Williamson ................. 210/521 |

* cited by examiner

Primary Examiner—Christopher Upton
(74) Attorney, Agent, or Firm—Hayes Soloway P.C.

(57) ABSTRACT

An apparatus for separating floating and non-floating particulates from drain water wherein said apparatus includes a first chamber for collecting non-floating particulates, a second chamber for collecting floating particulates, and a third chamber through which treated drain water can be discharged from the apparatus. An inlet pipe for introducing drain water into the first chamber is provided tangential to the first chamber to provide a vortex flow of drain water into said first chamber. An outlet pipe providing flow of drain water from the first chamber to the second chamber has an inlet at the vortex of drain water flow in the first chamber and an outlet that is spaced a predetermined distance from the floor of the chamber.

24 Claims, 3 Drawing Sheets

STORMWATER TREATMENT SYSTEM

The present invention relates generally to the treatment of stormwater and similar surface runoff. More particularly, the present invention relates to the removal of floatable and non-floatable matter there from so that cleaner water is returned to the environment.

Eighty percent of the pollution to the North American fresh water resource has been attributed to stormwater runoff. Sediments, contaminated by hydrocarbons and their floating residuals, flow freely from paved impervious sites into storm water collection systems. Mitigated wetlands and storm water ponds are historically accepted as the method of controlling storm water quality. While ponds and wetlands are, on one hand, an effective treatment for non-point source discharges, they nevertheless undesirably occupy valuable commercial property and create an open water liability.

Oil and grit separators have been used to control hydrocarbon loadings. Such a separator comprises a concrete structure linked to the storm drain system with two pools used to trap oil and grit. Such a separator is illustrated in "Hydrocarbon Hotspots in the Urban Landscape: Can they be Controlled?" *Watershed Protection Techniques*, Vol. 1, No. 1, February, 1994. This article states that recent research indicates that such oil and grit separators are not effective in trapping pollutants.

U.S. Pat. No. 5,759,415 describes a storm water treatment system which has a tangential inlet to a circular grit chamber wherein a swirling motion is produced to direct settleable solids toward the center and to reduce resuspension in the grit chamber. The water is released from the grit chamber into an oil chamber defined between the grit chamber and a barrier wall, which has an outlet that is located at the bottom thereof to thereby provide a baffle that traps floatables in the oil chamber. The barrier wall also has an upper overflow outlet. These outlets direct the water into a flow control chamber that has a lower outlet higher than the lower outlet from the oil chamber and has upper overflow outlet. These flow control chamber outlets, which are provided with weirs for flow control, direct the water into an outlet chamber from which the treated water is removed through a lower outlet pipe.

According to the '415 patent, the grit chamber outlet is in the wall thereof. Thus, water swirling along the side of the circular grit chamber wall is passed through this outlet. Suspended particulate matter may not have been adequately removed from this water by the time it passes into the outlet that is also inefficiently large in size. It is therefore considered desirable to more efficiently remove particulate matter from the water before it is passed into the oil chamber.

It is accordingly an object of the present invention to provide a more efficient storm water treatment system.

It is also an object of the present invention to provide such a system which is inexpensive, easy to operate, and reliable.

In order to provide such a system, in accordance with the present invention, runoff water is passed tangentially into a primary chamber wherein non-floatable matter is removed by swirling action of the water, then through an outlet for passage into a secondary chamber for removal of oil and other floatable matter therefrom, the outlet being located centrally of the primary chamber to remove water from which greater amounts of non-floatable matter has been removed.

The outlet from the primary chamber is preferably provided by a conduit that extends into the primary chamber with its end portion, which provides the outlet, disposed vertically.

The above and other objects, feature, and advantages of the present invention will be apparent in the following detailed description of the preferred embodiment thereof when read in conjunction with the appended drawings wherein the same reference numerals denote the same or similar parts throughout the several views.

DETAILED DESCRIPTION OF THE INVENTION

Figure 1:
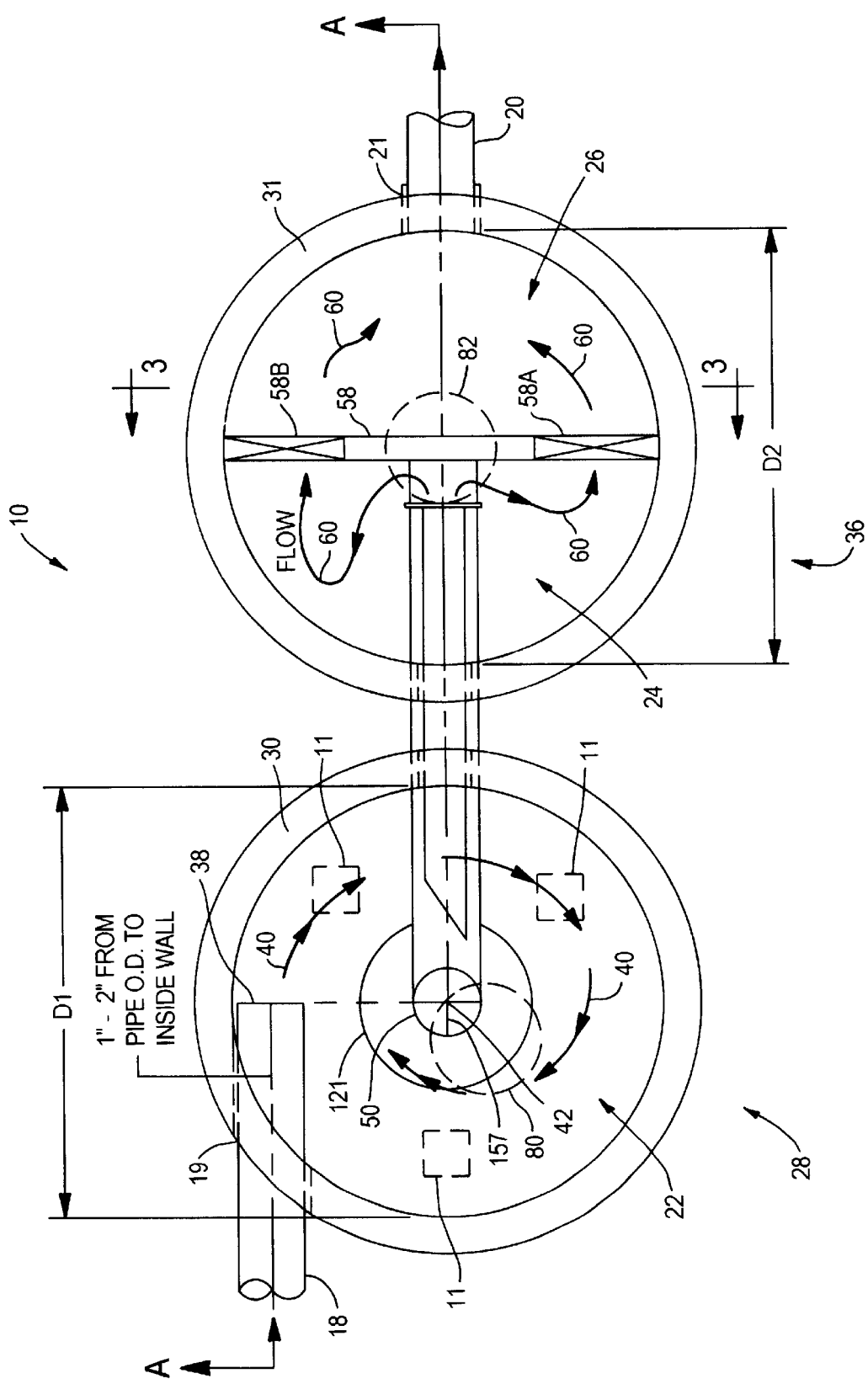
FIG. 1 is a plan view, with top covers removed to show internal structure, of a storm water treatment apparatus consistent with the present invention.

Referring to the drawings, there is illustrated generally at 10 an apparatus for treating water 12, such as stormwater or other surface runoff such as, for example, from industrial, commercial, and urban applications. The water 12 is treated by removing non-floatable matter such as sand, hydrocarbon-laden sediment, debris, silt, and heavy metals, illustrated at 14, and floatable matter such as oil and other petroleum-based liquids, illustrated at 16, therefrom. The contaminated water is received through inlet pipe 18, as illustrated at 19, and the treated water is discharged through outlet pipe 20 for return to the environment, as illustrated at 21, or as otherwise desired.

The apparatus 10 comprises a primary chamber, illustrated at 22, for removing sediment and other non-floatables 14 from the water, a secondary chamber, illustrated at 24, for removing oil and other floatables 16 from the water, and a tertiary effluent chamber, illustrated at 26. The water 12 initially enters the primary chamber 22 by flowing through inlet pipe or conduit 18 and is discharged from the tertiary chamber 26 although outlet conduit 20. The inlet conduit 18 typically would be an existing conduit sized for the flow rate to be handled, and the apparatus 10 typically would be constructed at the site for connection of the conduit 18 thereto.

The primary chamber 22 may be contained within a housing 28 which has a circular wall 30, a floor 32, and a ceiling 34 suitably joined together and composed of suitable material such as, for example, high strength steel-reinforced corrosion-resistant precast concrete suitable for heavy truck traffic loading. The floor 32 is desirably a monolithic base section for desirably providing anti-flotation of the housing 28. The housing 28 may, for example, be on the order of about 6 to 10 feet high and about 6 to 10 feet in inside diameter depending on the flow rate, on the order of about 3 to 26 or higher cubic feet per minute, the apparatus is to be capable of handling. The pipe 18 is suitably sealingly secured in an opening in the wall 30 of housing 28. Conduit 18 as well as other conduits described in this specification, which may be composed of steel, plastic, or other suitable material, may be suitably sealingly secured in openings in their respective walls by means of grout, illustrated at 19, or other suitable means. The secondary and tertiary chambers 24 and 26 respectively may be contained within a similarly shaped and sized housing 36, and which is shown to have a circular wall 31, a floor 33, and a ceiling 35. Alternatively, chamber 24 and 26 may be contained in separate housings. Housing 36 may be otherwise suitably shaped, such as, for example, rectangular in a horizontal plane. Outlet pipe 20 is suitably sealingly secured within an opening in the wall 31 of housing 36. Inlet 18 and outlet 20 are located at about the same height intermediate the heights of the housings 28 and 36 respectively, for example, at or slightly below midheight. Outlet pipe 20 exits radially of housing 36, i.e., in a direction along a direction in which a diameter of the housing extends. The outlet pipe 20 is sized to handle the flow rate and thus would typically have a diameter equal approximately to the diameter of inlet pipe 18.

When, during a storm event, the water flow through pipe 18 is near the capacity of pipe 18 (flow rate for which pipe 18 is sized), the water is flowed into the chamber 22 at high velocity to achieve a long path length for the solids during travel through the first chamber which allows the non-floatable solids 14 to desirably be deposited out or dropped to the bottom of the chamber 22 and thereby become separated from the water. The storm event creates the energy to achieve the desired velocity.

If desired, a suitable check valve may be installed on pipe 18 to prevent back-flow as well as to provide a nozzle effect by opening only under a head pressure thereby providing the desired velocity when there is flow into the chamber 22. A suitable check valve for this purpose is a Tideflex™ valve marketed by Red Valve Company, Inc. of Pittsburgh, Pa. Such a valve may be especially desirable in tidal areas to prevent back-flow.

Figure 2:
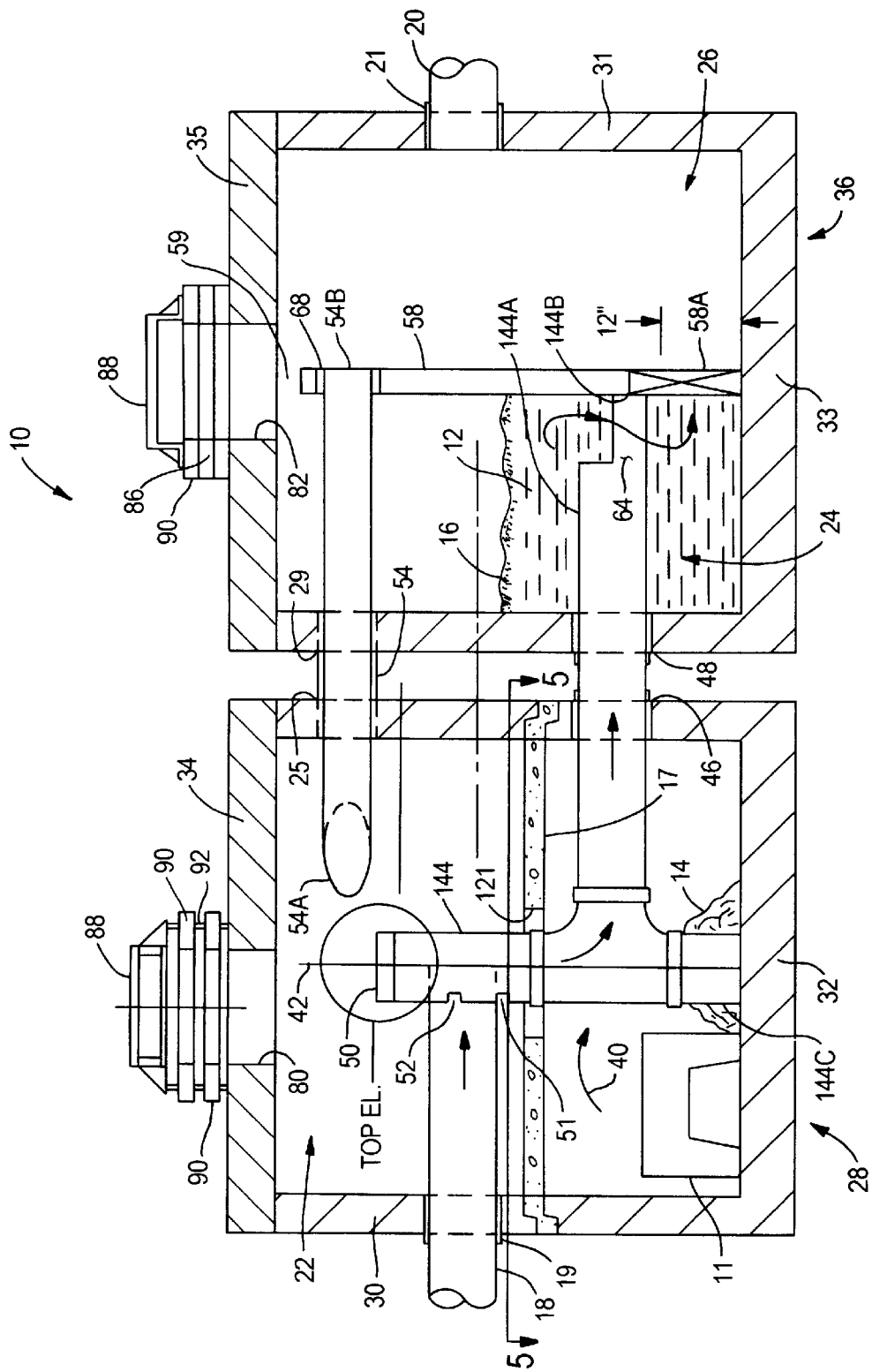
FIG. 2 is a sectional side view of the apparatus of FIG. 1 taken along lines A—A of FIG. 1.
Figure 3:
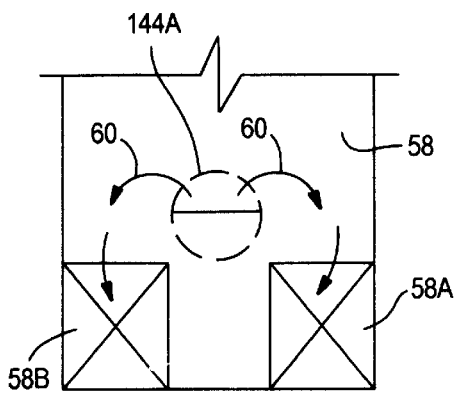
FIG. 3 is a section view taken along line 3—3 of FIG. 1.

The pipe 18 is disposed, as illustrated in FIG. 1, to be tangential to the primary chamber 22, i.e., it extends in a direction, in a horizontal plane, generally of a direction in which a tangent to the chamber 22 in the horizontal plane extends The high velocity water is thus introduced into the primary chamber 22 tangentially in order to effect a circular or swirling motion, illustrated at 40, to the water about the vertical axis 42 of the chamber 22 to form a void or vacuum or vortex and thereby drawing toward and into the vortex bodies subject to its action, i.e., drawing suspended particles 14 in the water into the vortex and dropping them onto the bottom of the chamber 22, as illustrated in FIG. 2. This vortex action is provided to also keep the non-floatable particles 14 on the chamber bottom so that they don't become re-entrained or resuspended in the water.

The water with the non-floatable matter 14 removed is then removed from the primary chamber 22 for passage into the secondary chamber 24 through an outlet 50. If the outlet was located in the circular chamber wall 30, as in the aforesaid Vortechnics apparatus, the water may not be as devoid of non-floatable matter as water nearer the vortex. Water is preferably removed near the vortex where it is more devoid of non-floatable matter. This allows a higher quality of partially treated water to be delivered to the secondary chamber 24 for more efficient water treatment. In accordance with the present invention, one section of a pipe or other suitable conduit 144A is received and suitably sealingly secured in adjacent openings 46 and 48 in the walls of primary and secondary chambers 22 and 24 respectively disposed a spaced distance, for example 12" as shown in FIG. 2, from the bottom surfaces of the chambers thereof for delivery of the water to the secondary chamber 24. The other end portion of the pipe 144 is positioned to extend vertically at the center 42 of the primary chamber 22 and terminates slightly above the height of pipe 18 at the inlet 38 to provide the opening 50 to serve as an inlet for the water at the center 42. The opening 50 is positioned at the center of the chamber 22 so that they are at the center of the vortex, the rotating motion of the water and the resulting low pressure at the vortex causes entrained particles to fall downwardly into a stable pile so that the water, but not the diverted particles, enters the intake at that location. Thus, the pipe extends horizontally from the secondary chamber 24 into the center of the primary chamber 22 then bends 90 degrees to extend vertically to its terminal end. The pipe 144 may be supported above the floor 32 of the housing 28 by a section of pipe 144C. The floor 32 provides a surface on which the non-floatable material 14 is received. The pipe 144 extends vertically upward above the height of the inlet 18. The entrance to the pipe may be shaped like an inverted truncated cone. Located in the center of the opening 50 may be an anti-vortex device 157. The anti-vortex device may be made of a suitable material such as a plastic or metal.

An anti-retrainment plate 17 is shown installed below the inlet of conduit 18 (for example, about 6 to 12 inches below the inlet). Such a shelf is considered to be optional. Without wishing to be bound by theory here or elsewhere in this specification, it is believed that such a plate 17 may be desirable to accelerate the settling of the solids 14 and provide some separation between the settled solids and the swirling water flow 40 whereby the space below the plate 17 may be relatively less turbulent so that the solids may more efficiently be kept separated. The anti re-entrainment plate 17 creates a flow gradient and pressure differential within swirling water flow 40. This pressure differential allows sediment to fall below the plate and to be trapped thus preventing re-entrainment.

Figure 5:
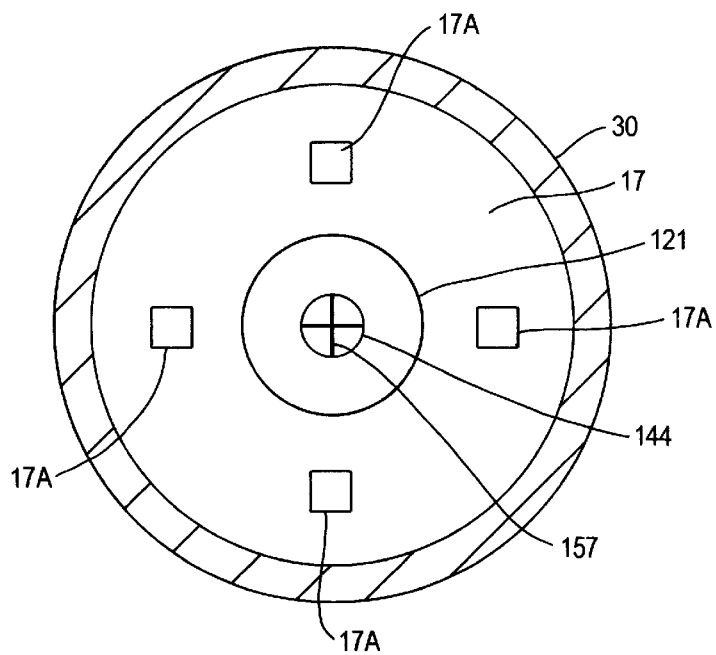
FIG. 5 is a sectional view taken along lines 5—5 of FIG. 2.

The anti-retrainment plate 17 is a plate that extends horizontally and may be supported by the wall 30. The plate has a centrally located opening 121, preferably circular, for allowing non-floatables 14 to settle to the bottom of the primary chamber 28. The opening 121 has a diameter that is substantially greater than that of the conduit 144 (for example, about twice the diameter of conduit 144) to provide an area underneath the vortex for the particles of sediment 14 to drop through. The plate may optionally have a plurality of openings or cutouts, illustrated at 17A in FIG. 5, spaced circumferentially about the plate 17 to allow a continuity of the swirling motion 40 below and above the plate 17. For example, the plate 17, which may have a thickness of about ¾ inch and may be composed of a similar material as an anti-vortex device 157 is composed, may have a plurality (four shown) of openings 17A equally spaced circumferentially about the plate and each of which may be square in shape, have a length and width each of approximately one tenth of the diameter of chamber 22, and be positioned approximately midway of a radius of chamber 22. Other opening shapes are also contemplated including circles, triangles, rectangles, and quadrilaterals as well as different quantities of opening, and arrangement.

A plurality of vortex breakers 11 with a sediment distribution notch may be circumferentially located about the floor 32 of the first chamber 22. The vortex breakers can be used to break the vortex flow and slow the flow and encourage suspended sediment to be deposited in chamber.

An opening 51 located in the pipe 144 provides for a coriolus intake of stormwater at low flow rates such as during lighter storms. The stormwater enters the first chamber 22 through the inlet 18 and exits the first chamber through the vertical pipe 144 and travels to the second chamber 24. In the embodiment shown, the opening is approximately 2" in diameter and is located at or below the level of the inlet pipe 18. The size of the opening may depend on the capacity of stormwater to be treated. A second opening 52 may be provided above the openings 51 by a small distance of, for example, about 6 inches in order to handle, in conjunction with openings 50, an increased flow rate. This also allows the openings 51 and 52 to be sized desirably small for increased efficiency of sediment removal, i.e., the sediment does not as easily enter the openings 51 and 52 when they are smaller. The single openings 51 and 52 may be replaced by a plurality of openings circumferentially disposed about the periphery of the pipe 144. For example, each opening 51 and 52 may comprise about 6 openings equally spaced circumferentially and each having a diameter of about 1 inch. A suitable baffle may be provided over each of the openings 51 and 52 to deflect particles, which have not already fallen, away from the openings 51 and 52 so that good efficiency of the apparatus 10 can be maintained. Thus, the coriolis intake is provided to allow the stormwater above the separated solids to pass virtually sediment-free to the next treatment phase in secondary chamber 24.

Figure 4:
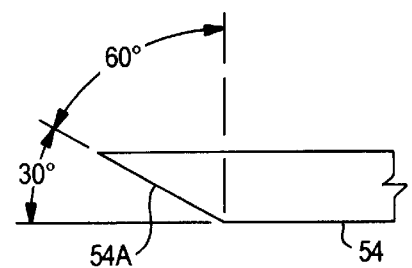
FIG. 4 is an enlarged plan view of a conduit of the apparatus of FIG. 1.

An overflow pipe or other suitable conduit 54 extends between the primary and tertiary chambers 22 and 26 respectively near the ceilings thereof, and is suitably sealingly attached in openings 25 and 29 in the walls thereof, for dumping some of the treated (due to the swirling action 40) water into the tertiary chamber 26 if the flow rate into the primary chamber 22 exceeds its capacity to handle it. The overflow pipe 54 extends radially, i.e., in a direction along which a diameter of the housing extends, into the first chamber 22 approximately half way to the axis 42. A first end 54A of the pipe 54 is cut at an angle to the vertical axis. The pipe provides an anti-vortex effect at high flows. Details of the angle are shown in FIG. 4. The angle may face towards or away from the inlet pipe 18. The angle is shown at 30°, although other angles are contemplated, preferably ranging from about 10° to about 80°. The second end 54B of the pipe 54 extend through an opening 68 in a barrier wall 58 that separate the second and the third chambers.

Oil and other floatable material 16 is separated from the water in the secondary chamber 24, i.e., means are provided for preventing the floatable material from entering the tertiary effluent chamber 26. The secondary chamber 24 is provided to be relatively quiescent, suitable for allowing oil and other floatable matter to float to the top without disruptedly mixing back into the water whereby such separation may efficiently occur. In order to prevent oil from entering the tertiary chamber 26, the barrier wall 58 extends upwardly from the floor 33 of the housing 36 and stops just below the ceiling 33, leaving a gap 59. Two openings 58A and 58B are formed along the lower edge of the wall 58 and the sidewall 31. The openings 58A and 58B are offset from the longitudinal axis of the pipe 144A. The top edges of the openings 58A and 58B are lower than the exit of the horizontal pipe 144A. Stormwater exiting pipe 144A enters the second chamber 24. The stormwater exits the second chamber 24 through the openings 58A and 58B and enters the third chamber 26. The stormwater follows a flow path, illustrated at 60. Since water entering chamber 26 comes from the bottom of the body of water in chamber 24 and since oil and other floatables rise to and float on top of the water, the flow path 60 is accordingly provided so that they do not enter the third chamber 26.

In order to prevent oil-laden water exiting pipe 144A from passing directly into pathway 60 so that good separation efficiency of the apparatus 10 is maintained, an upper portion of the pipe 144A is removed leaving only a lower portion 64 at the end 144B of pipe 144A. The lower portion 64 of the pipe 144A is secured in the barrier wall 58. The stormwater travels along the pipe 144A and is redirected by the barrier wall 58 so that the floatables 16 have time to rise after the water passes out of the pipe 144A. The gap 59 may allow storm water to pass in the event of a high flow rate.

The passage of the stormwater, with non-floatables 14 removed in the primary chamber and with floatables 16 removed in the secondary chamber 24 enters the tertiary effluent chamber 26 for its removal through pipe 20 to the environment in an environmentally desirable cleansed state.

Thus, the trapped floating contaminants 16 in secondary chamber 24 are raised with the water level therein, which is kept at that level or higher by the height of exit pipe 20 so that the floatable contaminants, created by the storm event and subsequent storm events, are not washed out through the pipe 20. The stormwater level in secondary chamber 24 is normally maintained during quiescent periods at the height of the exit pipe 20.

An opening, illustrated at 80, is contained in the ceiling 34 for venting as well as to allow access to primary chamber 22 for removing the sediment 14 therefrom and otherwise maintaining it. Similarly, a vent opening, illustrated at 82, is contained in the ceiling 35 and which allows access to chamber 24 and 26 for skimming the oil 16 from the surface of the water and removal thereof and otherwise for maintenance. Opening 80, which may have a diameter of, for example, about 24 inches, is suitably positioned so that it is not directly over the outlet provided by pipe 144 Opening 82 may be similarly sized. To each of these openings is suitably installed, in known manner, a hatch 86 with a suitable vented cover 88, each of cast iron, steel, plastic, or other material. In order to allow for elevation change, i.e., so that the vent outlets are desirably above grade, riser rings 90 are provided between the respective ceiling and the cover 88, and the riser rings are suitably sealed to each other and to the ceiling and the cover by, e.g., butyl joint material, illustrated at 92, or other suitable means. The number of riser rings 90 (three shown for each hatch) will vary depending on elevation. The hatch for the primary chamber is illustrated with the riser rings apart for ease of illustration.

If desired, additional equipment may optionally be added to the apparatus 10 for improving the separation efficiency thereof. For example, the secondary chamber 24 may be provided with an ECOSEP™ oil-water separator, marketed by env21™ of East Pembroke, N.Y., or other suitable high efficiency separator (with internal storage containment) for additional treatment (during non-storm events) to purify down to perhaps about 5 parts per million of non-emulsified free oil. For another example, a suitable coalescing filter structure, conventionally known in the art, may be attached to the outlet of the pipe 144A in the secondary chamber 24 to coalesce floatable particles into clumps thereof so that they more efficiently rise to the surface.

Thus, in accordance with the present invention, the outlet from the primary chamber is provided at the location of the vortex in order to receive water with a maximum of non-floatable particles removed therefrom so that the contaminant removal efficiency may be maximized, to achieve a removal rate efficiency of perhaps about 80 percent for a typical bimonthly rainfall activity.

It should be understood that, while the present invention has been described in detail herein, the invention can be embodied otherwise without departing from the principles thereof, and such other embodiments are meant to come within the scope of the present invention as defined in the following claim(s).

What is claimed is:

1. An apparatus for separating floating and non-floating particulates from drain water, comprising:
   a first chamber for collecting non-floating particulates, including a first inlet for directing drain water tangentially into the first chamber to provide a vortex flow of drain water within said first chamber,
   a second chamber for collecting floating particulates, an outlet pipe providing flow of drain water from the first chamber to the second chamber comprising a second inlet at the vortex of drain water flow in the first chamber and an outlet in the second chamber spaced a predetermined distance from a floor, and
   a third chamber through which treated drain water can be discharged from the apparatus, the third chamber in fluid communication with the second chamber through an opening between the second chamber and the third chamber, the opening offset from the axis of the outlet in the second chamber.

2. The apparatus of claim 1, wherein the outlet extends a predetermined distance into the second chamber.

3. The apparatus of claim 1, wherein the outlet in the second chamber is above the opening between the second chamber and the third chamber.

4. The apparatus of claim 1, the first chamber further comprising a horizontal plate disposed below the level of the first inlet to prevent non-floatable particles from becoming re-entrained in the drain water.

5. The apparatus of claim 4, wherein the horizontal plate further comprises an opening concentric with a vertical axis of the first chamber to allow the non-floatable particles to pass there through.

6. The apparatus of claim 1, wherein the outlet pipe terminates at a barrier that separates the second and the third chambers, the drain water exiting the outlet pipe through an upwardly facing opening.

7. The apparatus of claim 1, wherein the outlet pipe further comprises an opening spaced a predetermined distance below the first inlet to allow drain water to enter the outlet pipe during lower flow rate periods.

8. The apparatus of claim 1, further comprising a conduit extending from a third inlet in the first chamber to a second outlet in the third chamber to allow drain water to flow during peak storm flows, thereby bypassing the second chamber.

9. The apparatus of claim 8, wherein the third inlet extends a predetermined distance into the first chamber.

10. The apparatus of claim 8, wherein the third inlet is formed at an angle to the longitudinal axis of the conduit.

11. The apparatus of claim 1, further comprising a plurality of vortex breakers located along a floor of the first chamber to aid in the trapping of non-floatable particles.

12. The apparatus of claim 1, wherein an anti-vortex device is provided at the second inlet to provide quiescent flow into the second chamber.

13. The apparatus of claim 12, wherein said anti-vortex device is for controlling the velocity of swirl or cyclonic effect of the drain water entering the outlet pipe whereby to negate the tendency for trapped non-floating particulate from being drawn into said outlet pipe during peak storm flows.

14. An apparatus for separating floating and non-floating particulates from drain water, comprising:
   a first chamber for collecting non-floating particulates, including a first inlet for directing drain water tangentially into the first chamber to provide a vortex flow of drain water within said first chamber,
   a second chamber for collecting floating particulates, an outlet pipe providing flow of drain water from the first chamber to the second chamber comprising a second inlet at the vortex of drain water flow in the first chamber and an outlet in the second chamber spaced a predetermined distance from a floor, and
   a third chamber, in fluid communication with the second chamber, through which treated drain water can be discharged from the apparatus, wherein the outlet pipe terminates at a barrier that separates the second and the third chambers, the drain water exiting the outlet pipe through an upwardly facing opening.

15. The apparatus of claim 14, wherein the outlet extends a predetermined distance into the second chamber.

16. The apparatus of claim 14, the first chamber further comprising a horizontal plate disposed below the level of the first inlet to prevent non-floatable particles from becoming re-entrained in the drain water.

17. The apparatus of claim 16, wherein the horizontal plate further comprises an opening concentric with a vertical axis of the first chamber to allow the non-floatable particles to pass there through.

18. The apparatus of claim 14, wherein the outlet pipe further comprise an opening spaced a predetermined distance below the first inlet to allow drain water to enter the outlet pipe during lower flow rate periods.

19. The apparatus of claim 14, further comprising a conduit extending from a third inlet in the first chamber to a second outlet in the third chamber to allow drain water to flow during peak storm flows, thereby bypassing the second chamber.

20. The apparatus of claim 19, wherein the third inlet extends a predetermined distance into the first chamber.

21. The apparatus of claim 19, wherein the third inlet is formed at an angle to the longitudinal axis of the conduit.

22. The apparatus of claim 14, further comprising a plurality of vortex breakers located along a floor of the first chamber to aiding the trapping of non-floatable particles.

23. The apparatus of claim 14, wherein an anti-vortex device is provided at the second inlet to provide quiescent flow into the second chamber.

24. The apparatus of claim 23, wherein said anti-vortex device is for controlling the velocity of swirl or cyclonic effect of the drain water entering the outlet pipe whereby to negate the tendency for trapped non-floating particulate from being drawn into said outlet pipe during peak storm flows.

* * * * *